INVENTOR.
DONALD A. CAULFORD
JAMES R. PHIN

INVENTOR.
DONALD A. CAULFORD
JAMES R. PHIN

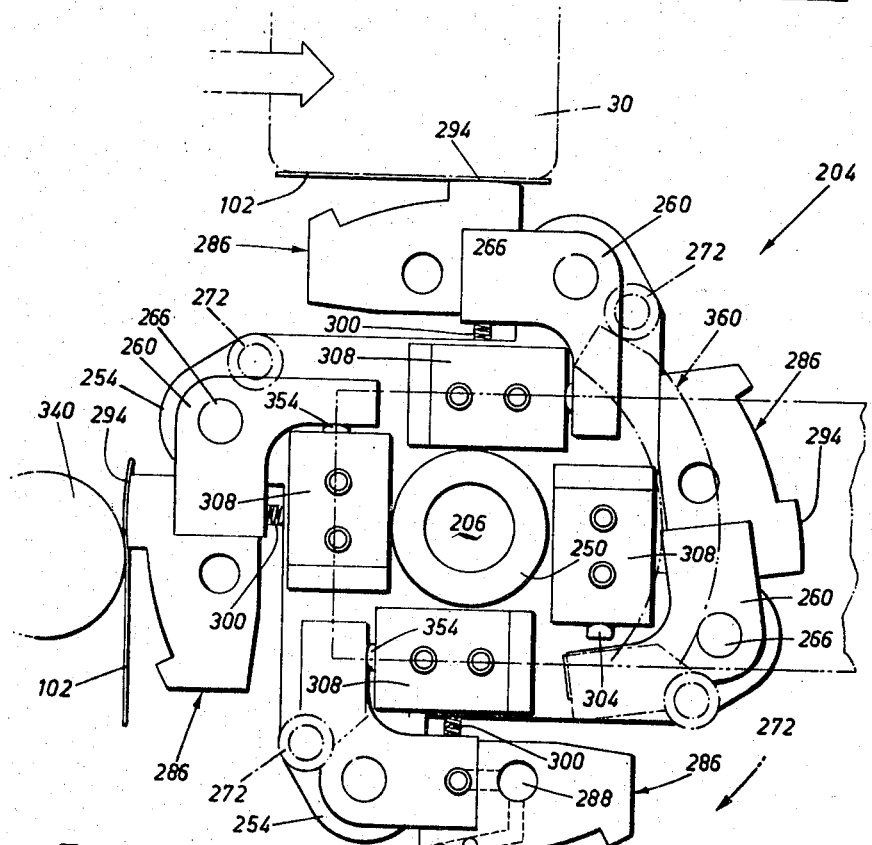
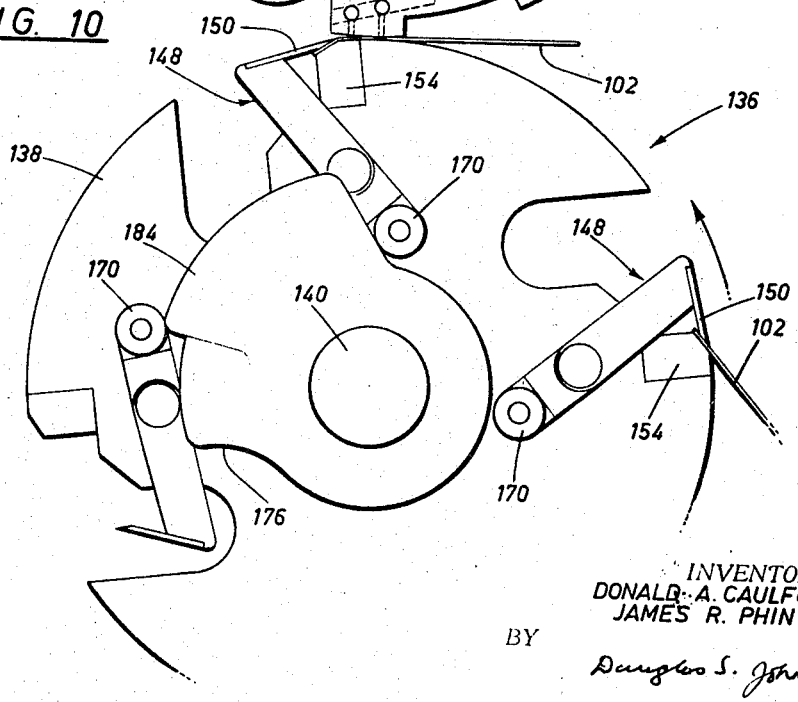
FIG. 10

INVENTOR.
DONALD A. CAULFORD
JAMES R. PHIN

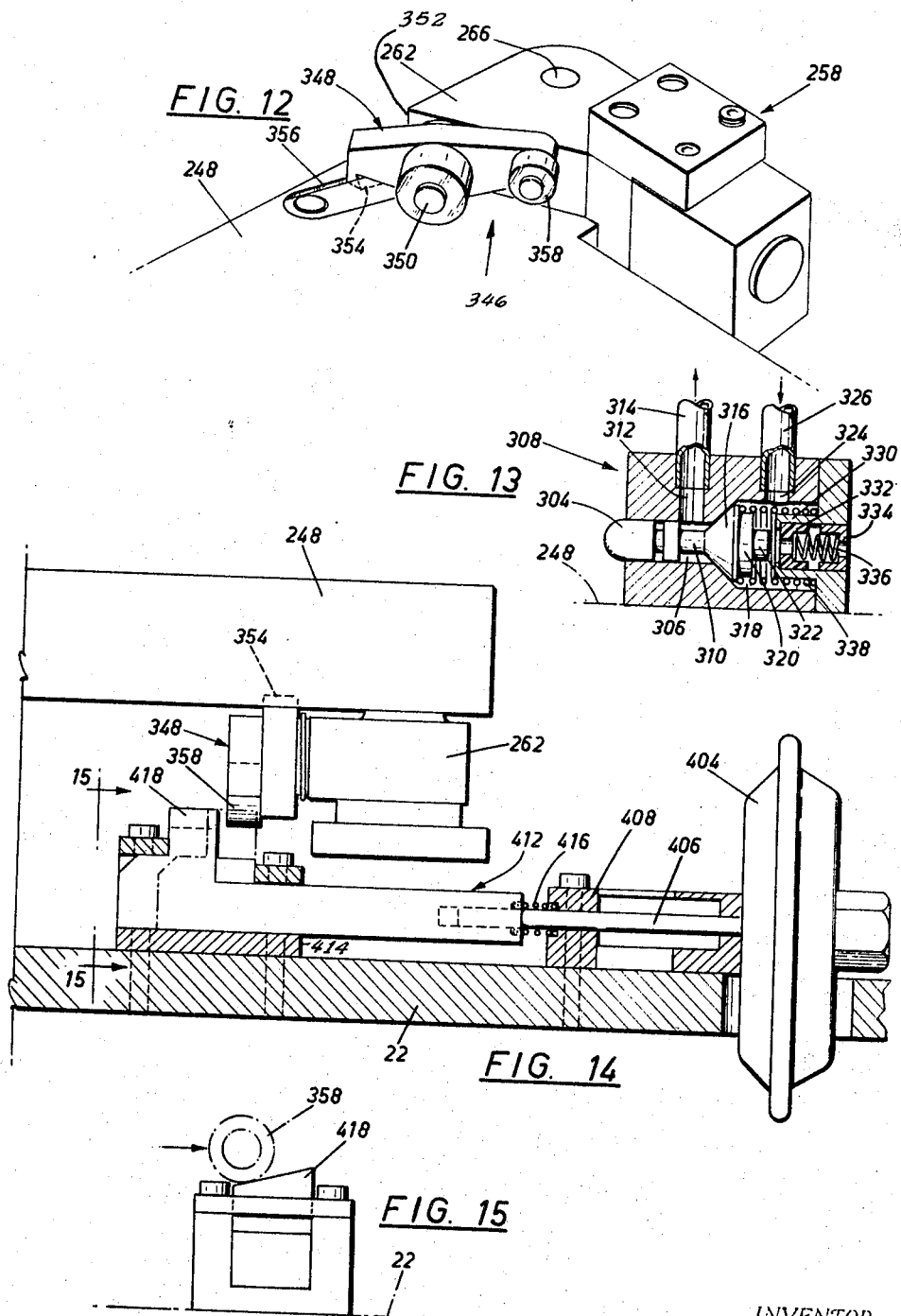

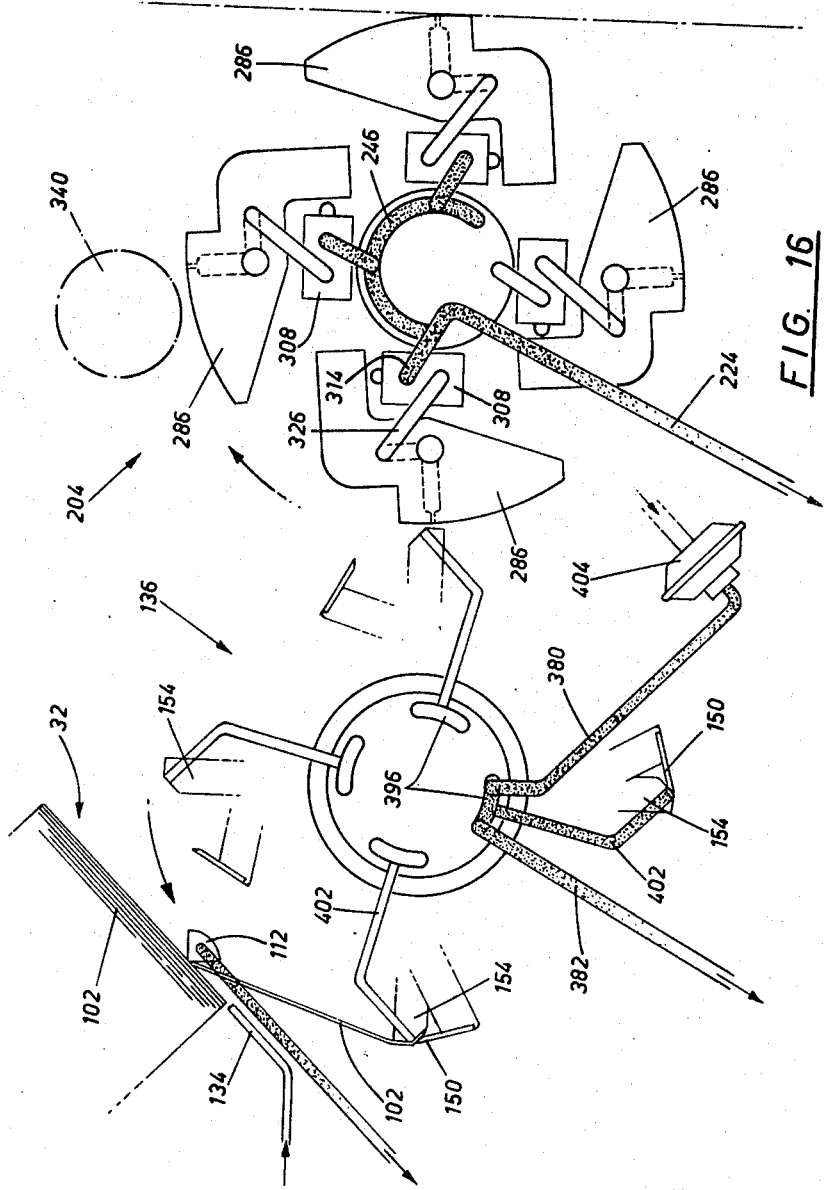

United States Patent Office 3,450,586
Patented June 17, 1969

3,450,586
AUTOMATIC LABELLING APPARATUS
Donald Alexander Caulford and James R. Phin, Toronto, Ontario, Canada, assignors to Canadian Stackpole Ltd., Toronto, Ontario, Canada
Filed Oct. 4, 1965, Ser. No. 492,945
Int. Cl. B65c 9/26, 9/20, 9/14
U.S. Cl. 156—364                                    18 Claims

ABSTRACT OF THE DISCLOSURE

An automatic labelling apparatus for containers moving on a conveyor is constructed of a rotary gripper for taking single labels from a magazine, the gripper cooperating with a rotating vacuum pad to which the label is transferred, after which is contacts a glue applicator, the label being than applied to the passing container; the vacuum pad is inwardly pivotable to prevent contact with the glue applicator if a label is absent.

---

This invention relates to apparatus for labelling bottles or containers in continuous automatic sequence and has particular relation to applying a label evenly to a bottle or container while ensuring that the edges of the label are firmly secured thereto.

Apparatus designed to apply a label to a container, more particularly over the top thereof, has been described in U.S. Patent 3,097,983. In the described apparatus the labels are stacked in an inclined magazine which feeds them under gravity to a reciprocable vacuum bar after which successive labels are transferred to a label gripping mechanism in the form of a drum which is mounted to turn on a horizontal axis. The drum is provided with a plurality of label gripping elements on its periphery and spaced uniformly circumferentially therearound; arrangements are made for the label gripping elements to be supplied with water and then glue contained in a dispensing device after which an individual label is applied to a bottle simultaneously with its release from the label gripping element.

In the above arrangement and sequence of operations the edge of the label which is held in the gripping element is not supplied with glue and while this is not detrimental when the label is in the form of a small seal applied over the top of a bottle, the absence of glue at one edge or larger labels applied to the side of a bottle facilitates their removal and detracts from their appearance.

It is an object of the invention to provide improved automatic labelling apparatus by which the labels are continuously and completely adhered to a moving container.

It is a further object of the invention to provide automatic labelling apparatus for more economical manufacture, less costly maintenance and to improve control and operation of the stages in the labelling of the container.

The apparatus of the invention includes a label applying mechanism formed of a rotatable hub element which is provided with a plurality of spaced apart vacuum supplied pads at its periphery, each of the vacuum pads carrying a label whereby on each revolution of the hub element the label on each pad contacts a glue applicator after which it is applied to the passing container carried on an adjacent main conveyor.

It is a further feature of the invention that a label gripping mechanism of the type formed from a rotatable drum element and provided with a plurality of label gripping elements on its perimeter, each removing one label at a time from an adjacent magazine, is synchronized to rotate with the hub element so that the label on each gripping element is released on the opposite side of the drum with respect to the magazine when a respective vacuum pad contacts the label, thus effecting a transfer.

It is a further feature of the invention that the vacuum pads are pivoted inwards toward the centre of the hub element at which time the pad is vented to atmosphere; also each is provided with a retaining mechanism and it is maintained in a position where it will not contact the glue applicator unless a label is transferred to the pad which transfer is noted by a sensing mechanism.

It is a further feature of the invention that the label gripping mechanism co-operates with a magazine containing a stack of labels, which magazine is provided with a spring biased plate urging the labels towards the label gripping mechanism, arrangements being made in the magazine to provide a blast of air towards the side of the stack of labels to assist in the separation of the forwardmost label from the remainder of the stack.

The invention will now be described with reference to the accompanying drawings, in which:

FIGURE 10 is a cross sectional view of the label applying mechanism and part of the co-operating label gripping mechanism;

FIGURE 12 is a view of the latching device on the underside of the label applying mechanism;

FIGURE 13 is an enlarged view of an individual valve which controls the vacuum supplied to an associated vacuum pad carried by the label applying mechanism;

FIGURE 14 is a sectional view of the mechanism for activating the latching device;

FIGURE 15 is a cross sectional view taken on the line 15—15 of FIGURE 14 illustrating the movement of the latching device;

FIGURES 16, 17, 18, 19 and 20 are diagrammatic illustrations of the operation of the sensing control mechanism;

Figure 1:
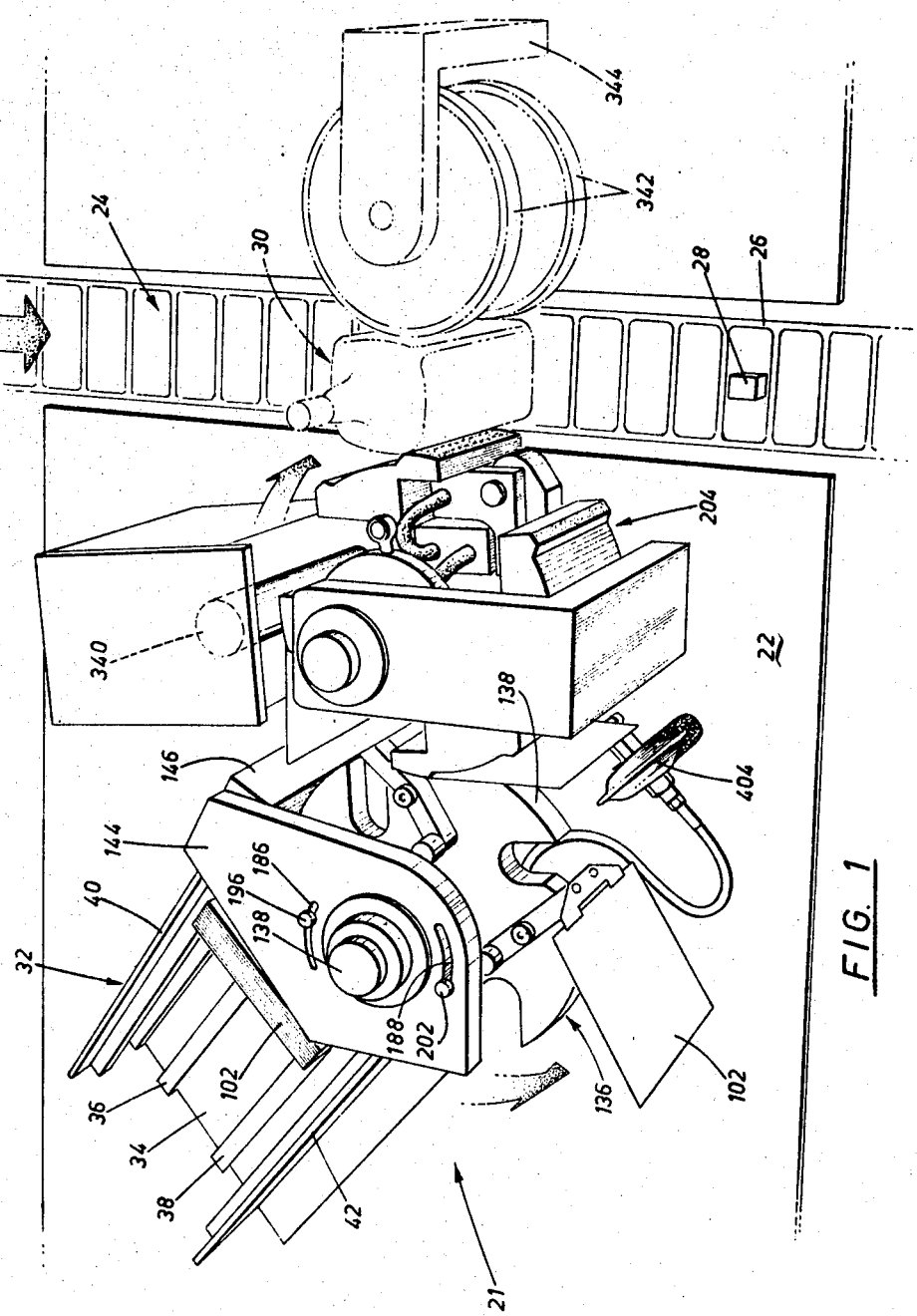
FIGURE 1 is a perspective view of the apparatus.
Figure 2:
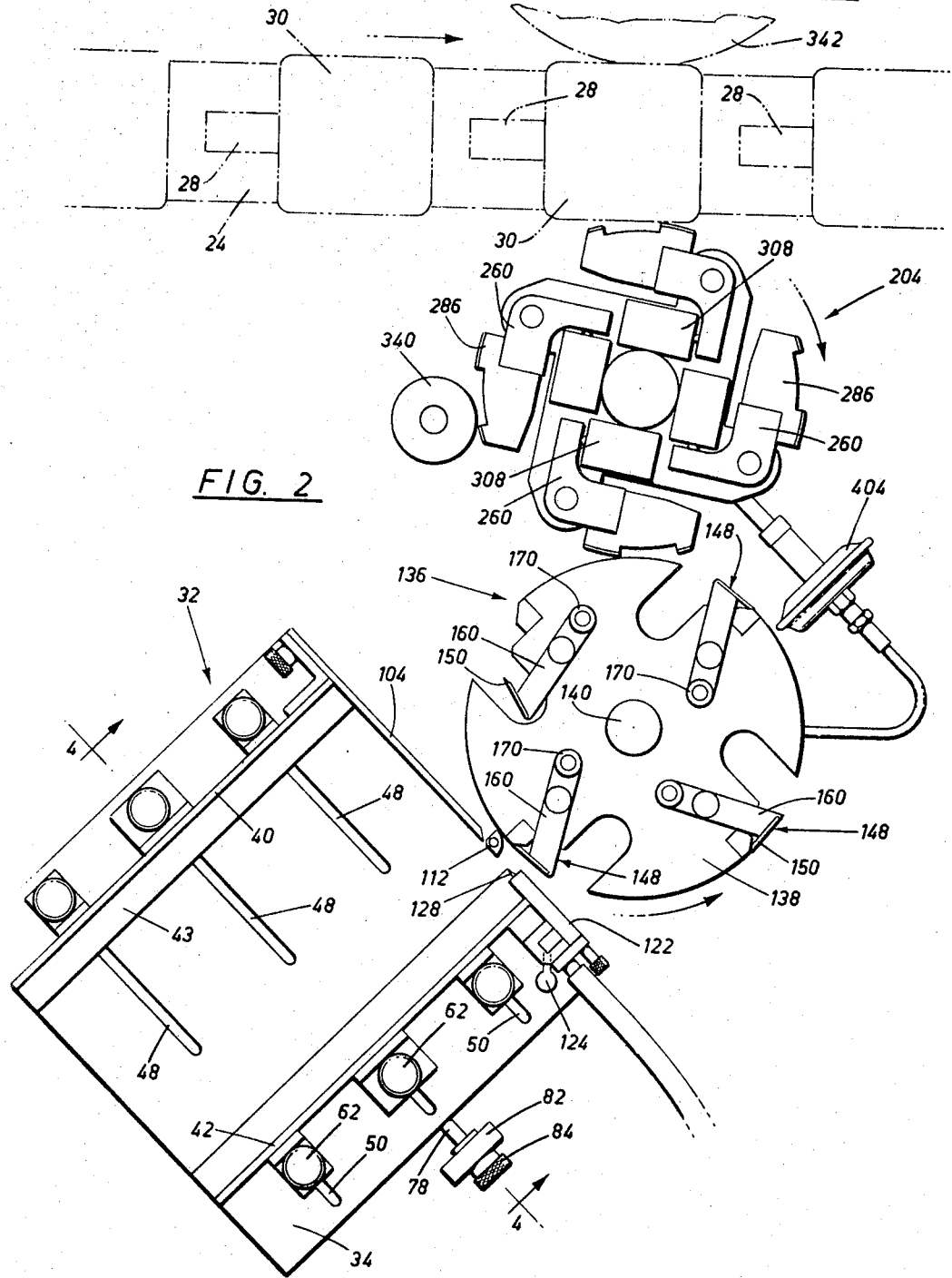
FIGURE 2 is a cross sectional view of the apparatus shown in FIGURE 1.

In the description like parts are given the same number and referring now to FIGURE 1 an automatic labelling apparatus constructed in accordance with the invention is generally indicated with the numeral 21, being carried on a platform or table 22. The automatic labelling apparatus 21 is positioned alongside a conveyor structure, generally indicated by the numeral 24 which forms the basis of U.S. Patent 3,097,983 and essentially consists of an endless chain belt conveyor 26 which is mounted on and driven by means of suitable sprocket wheels and driving connections from a main motor, not shown. Container locating devices 28 are carried on the chain belt 26, the container locating devices 28 providing the means of spacing the containers 30 which are carried on the endless chain belt 26.

Figure 3:
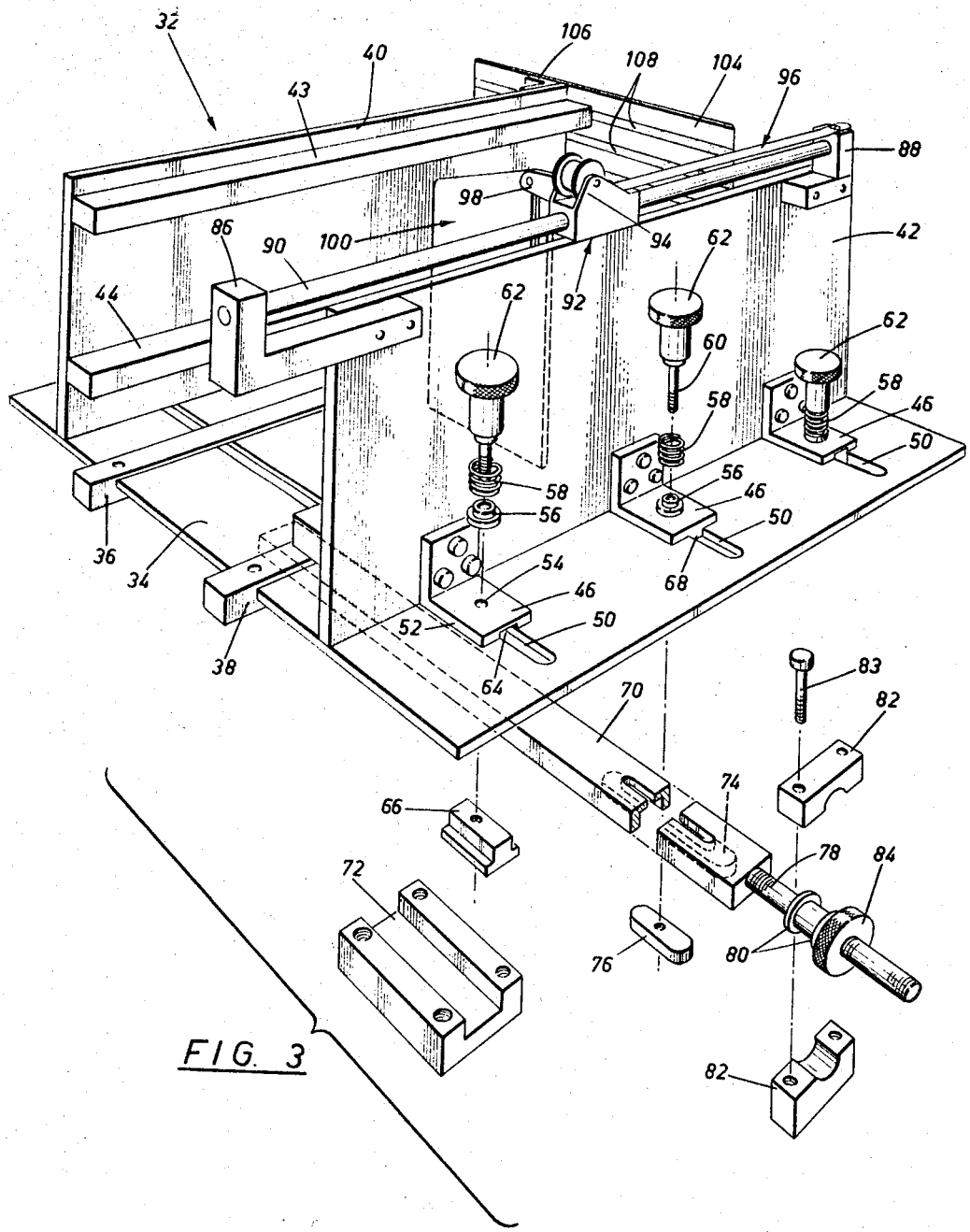
FIGURE 3 is a partly exploded view of the magazine.
Figure 4:
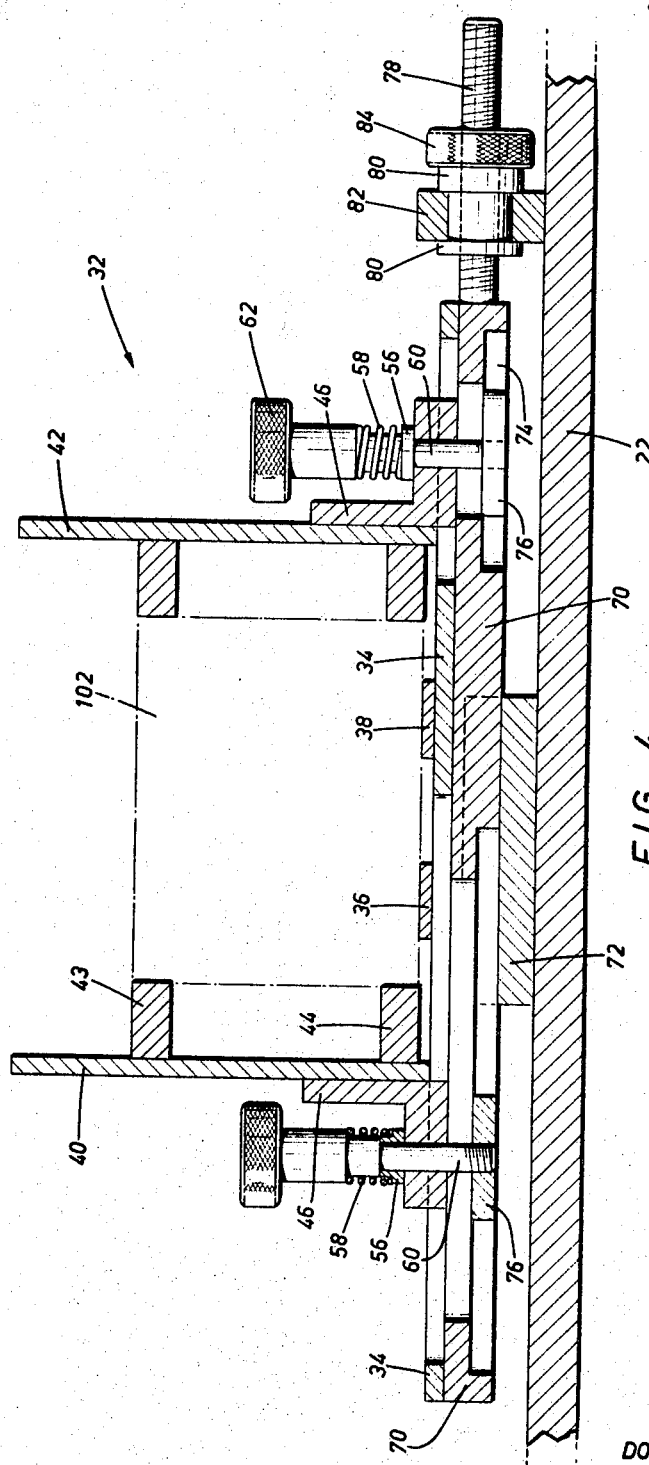
FIGURE 4 is a cross sectional view of the magazine on the lines 4—4 of FIGURE 2.
Figure 5:
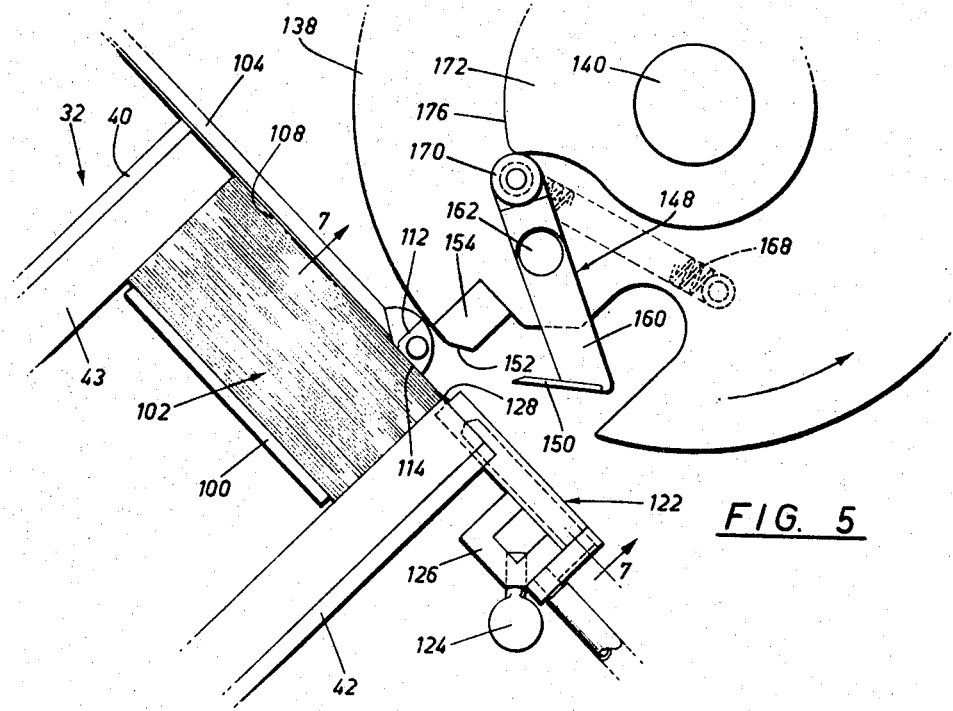
FIGURE 5 is an enlarged cross sectional view of part of the label gripping mechanism prior to its gripping a label.

The automatic labelling apparatus 21 includes a magazine 32 formed of a horizontally disposed plate 34, having on its upper surface a pair of spaced apart rails 36 and 38, see FIGURE 3. The horizontally disposed plate 34 supports a pair of spaced apart movable vertical plates 40 and 42 disposed parallel to and outwardly of the rails 36 and 38. Each of the vertical plates 40 and 42 are provided on their inner faces with an upper and lower horizontal rail 43 and 44. Three spaced apart angle irons 46 are secured to the lower part of each of the plates 40 and 42, the angle irons 46 overlying similarly spaced apart slots 48 and 50 provided respectively in the horizontally disposed plate 34 outwardly of the rails 36 and 38; the slots 48 are considerably longer than the slots 50.

The horizontal leg 52 of each angle iron 46 is provided with an aperture 54 over which is positioned a locating cap 56 on which rests a spring 58 through which extends the threaded shank 60 of a knurled headed screw 62.

The horizontal leg 52 of each of the outer angle irons 46 secured to the vertical plates 40 and 42 are provided with an undercut 64 in which rides the upper part of a key 66, the flanged lower part of which bears against the underside of the platform 22. Each horizontal leg 52 of the middle angle irons 56 is provided on its underside with a key 68 which is located in the respective slots 48 and 50, the keys 68 providing the means for locating the vertical plates 40 and 42 on the horizontally disposed plate 34.

A bar 70 rides in a keyway 72 secured to the platform 22 and is disposed under the plate 34 in line with the intermediate slots 48 and 50. The bar 70 is provided with a pair of longitudinal undercuts 74 corresponding in length with the respective slots 48 and 50 and an individual key 76 rides in the respective slots 48 and 50 being releasably engageable with the threaded shanks 60 of the intermediate screws 62. The end of the bar 70 adjacent the outer side of the plate 40 is secured to a threaded rod 78 provided on its mid portion with a pair of spaced apart discs 80 which bear against the opposed faces of split collar members 82 secured to the platform 22 by means of screws 83. A knurled disc 84 is secured to the threaded rod 78 outward of the collar 82.

Movement of the bar 70 by rotation of the knurled disc 84 provides a means of adjustment of the magazine 32 with respect to the platform 22, this adjustment, of course, being effected after release of the intermediate screws 62. The individual adjustment of the vertical plates 40 and 42 is effected by release of the outer screws 62, it being appreciated that the vertical plate 40 is capable of greater movement than the vertical plate 42 because of the difference in length of the respective underlying slots 48 and 50.

Upstanding angle irons 86 and 88 are secured at the opposed ends of the upper edge of the vertical plate 42. A horizontally disposed rod 90 is secured to the angle irons 86 and 88 and the rod 90 carries a slider 92 which has a pair of upstanding ears 94. A coiled spring 96 is journalled in the upstanding ears 94 and the free end of the coiled spring 96 is secured to the angle iron 88. An arm 98 directed towards the vertical plate 40 is secured to the slider 92 and a plate 100 disposed normally between the vertical plates 40 and 42 is adjustably secured to the arm 98.

The spring biased vertical plate 100 bears against a pack of labels 102 which, in turn, bear against a transverse plate 104 which is adjustably secured, for lateral movement, to the vertical plate 40 by means of a bracket 106. The inner surface of the transverse plate 104 bearing against the pack of labels 102 is provided with horizontally disposed Teflon strips 108 which reduces the frictional resistance during withdrawal of individual labels from the pack 102, such withdrawal being further assisted by tapering in the direction of the pack 102 the vertical edge 110 of the transverse plate 104.

Figure 7:
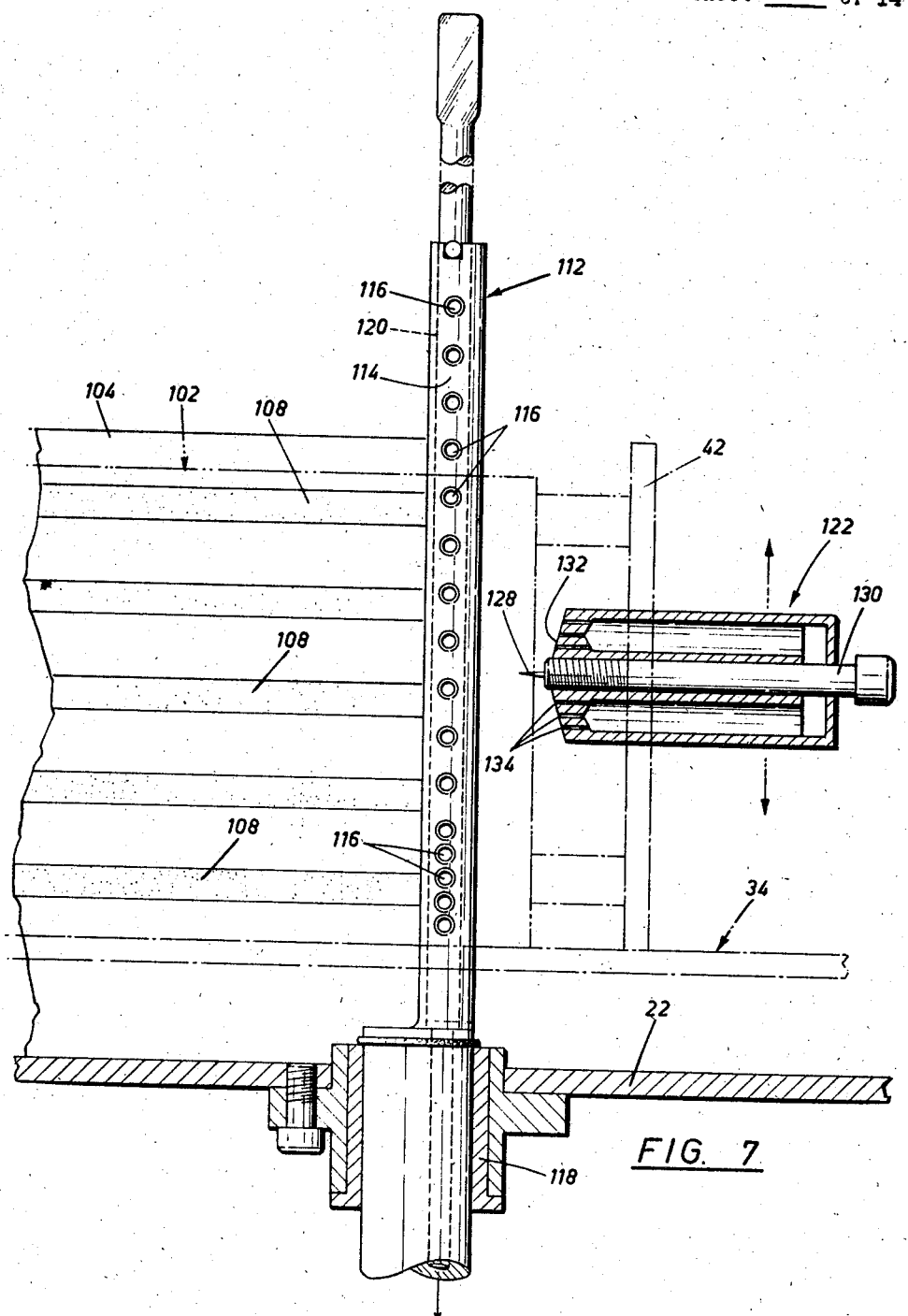
FIGURE 7 is a vertical cross sectional view taken on the 7—7 of FIGURE 5 and showing the arrangement to provide a blast of air to the magazine to facilitate separation of a label.

The arrangement for transferring individual labels from the pack 102 is essentially the same as that described in U.S. Patent 3,097,983 though with some alterations in disposition and also an improvement more specifically shown in FIGURE 7. In the first place a vacuum bar 112, provided with a flat label contacting face 114 and a plurality of apertures 116, is vertically, and not horizontally, disposed; the bar 112 is supported in a bearing 118 carried in the platform 22, the central bore 120 of the vacuum bar 112 being connected to a vacuum source. The vacuum bar 112 is arranged to rotate outwardly in a vertical plane through an angle of 45° from a position where the flat face 114 contacts the adjacent individual label.

Figure 6:
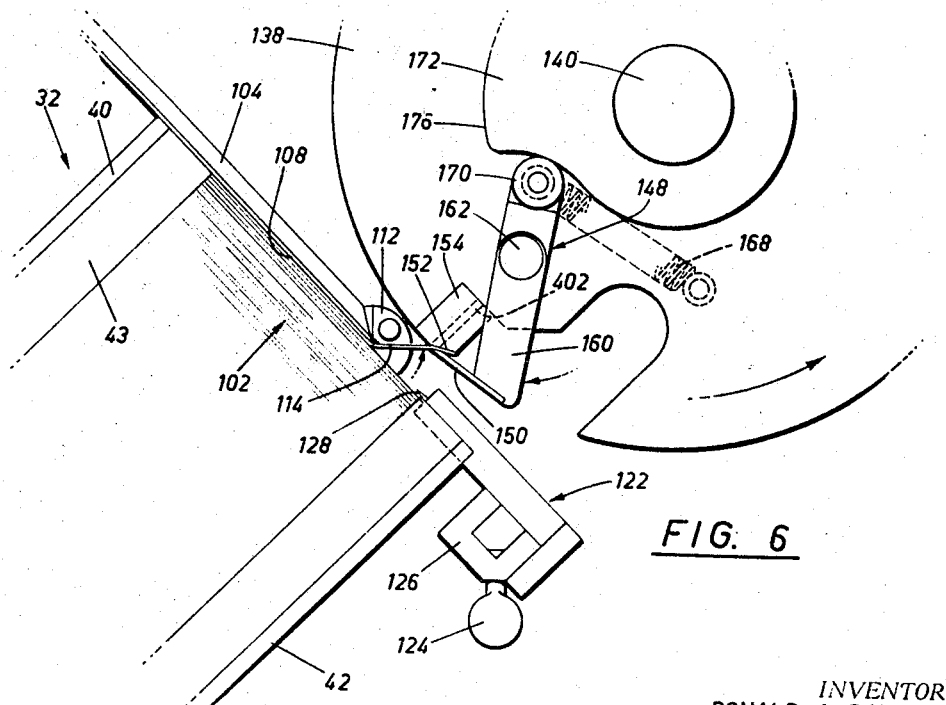
FIGURE 6 is an enlarged cross sectional view of the same part of the apparatus shown in FIGURE 5 after the label has been gripped.

An improvement for separating the forwardmost label from the pack 102 comprises a horizontally disposed member 122 which is adjustably secured by means of a screw 124 to a vertical post 126 located at the side of the vertical plate 42, see FIGURE 6. A pin 128, see FIGURE 7, whose tip is arranged to bear against the outer surface of the forwardmost label of the pack 102, is carried in the end of a threaded rod 130 which is axially disposed in the hollow member 122, rotation of the threaded rod 130 thereby permitting adjustment of the position of the pin 128 with respect to the label. The wall 132 of the hollow member 122 adjacent the pin 128 is provided with apertures 134, the hollow member 122 being connected to an air supply, so that pressure is directed through the apertures 134 to maintain the separation of the forwardmost label when it has been moved outwardly by the vacuum bar 112.

The label gripping mechanism, generally denoted by the numeral 136, is an improved arrangement of that described in U.S. Patent 3,097,983. As illustrated in FIGURES 1, 5, 6 and 8 it comprises a drum element 138 mounted for rotation on a vertically disposed shaft 140 to which it is keyed by a boss 142, the lower end of which is journalled in the platform 22 and the upper end in a horizontally disposed plate 144 supported by two diametrically opposed uprights 146. Spaced uniformly around the drum element 138 are a plurality of grippers 148 each consisting of a plate element 150 adapted to swing from registration with the inwardly inclined clamping edge 152 of the fixed finger 154, having sleeves 156 pinned to opposed sides of the drum element 138 through an aperture 158. The plate element 150 is secured to the base of a U-shaped member 160 which is supported on a connecting pivot 162 extending through a bushing 164 provided in the drum 138. The underside of the U-shaped member 160 is provided with a lug 166 to which is attached a spring 168, the other end of which is secured to the underside of the drum 138; the spring 168 biases the plate element 150 into the position of registration with the clamping edge 152.

Secured to the free end of the upper part of the U-shaped member 160 is a roller 170 which is mounted to co-operate with a cam 172 adjustably fixed in relation to the drum element 138 as described below. The body of the cam 172 is in the form of a collar surrounding the shaft 140; the cam 172 has a peripheral camming surface 176 which is contoured so that its contact with the roller 170 maintains the plate element 150 out of registration with the inwardly inclined clamping edge 152 until a point is reached on rotation of the drum element 138 which coincides with presentation of a label by the vacuum bar 112 to the inclined clamping edge 152. At this point the plate element 150 is instantly released and is caused to move by the spring 168 into clamping relation with the inclined clamping edge 152 to grip the label.

The release of the label on the opposed side of the drum element 138, see FIGURE 10, is achieved by co-operation of the roller 170 with another cam 178 also in the form of a collar, the position of which is also adjustable with relation to the drum element 138 as described below; the cam 178 rests on the seat 180 formed with an upper flange 182 on the cam 172. The movement of the plate element 150 out of registration with the inclined clamping edge 152 is effected by the roller 170 moving along the peripheral camming surface 184 provided on the cam 178.

To provide for separate adjustment and positioning of the two cams 172 and 178, and hence the instant at which the plate element 150 moves into clamping relation on one side of the drum element 138 and out of clamping relation on the other side, a pair of opposed arcuate slots 186 and 188 are provided in the plate 144, see FIGURE 1. A collar 190 surrounding the shaft 140 is positioned immediately under the plate 144, the upper portion of the collar 190 having a tongue 192 extending normally therefrom. A threaded bore 194 extends through the tongue 192 and aligns with the arcuate slot 186, the pin 194 being provided with a screw 196. The lower portion of the collar 190 is surrounded by the cam 178 and is secured to the flange 182 on the lower cam 172. Extending normally from the upper cam 178 is a tongue 198 which is stepped upwards to lie in the same plane as the tongue 192 on the collar 190. The tongue 198 is provided with a threaded bore 200 which aligns with the other slot 188, the threaded bore 200 being provided with a screw 202. The position of the two cams 172 and 178 and hence their position of operation may be adjusted by moving the position of the threads 194 and 200.

Figure 9:
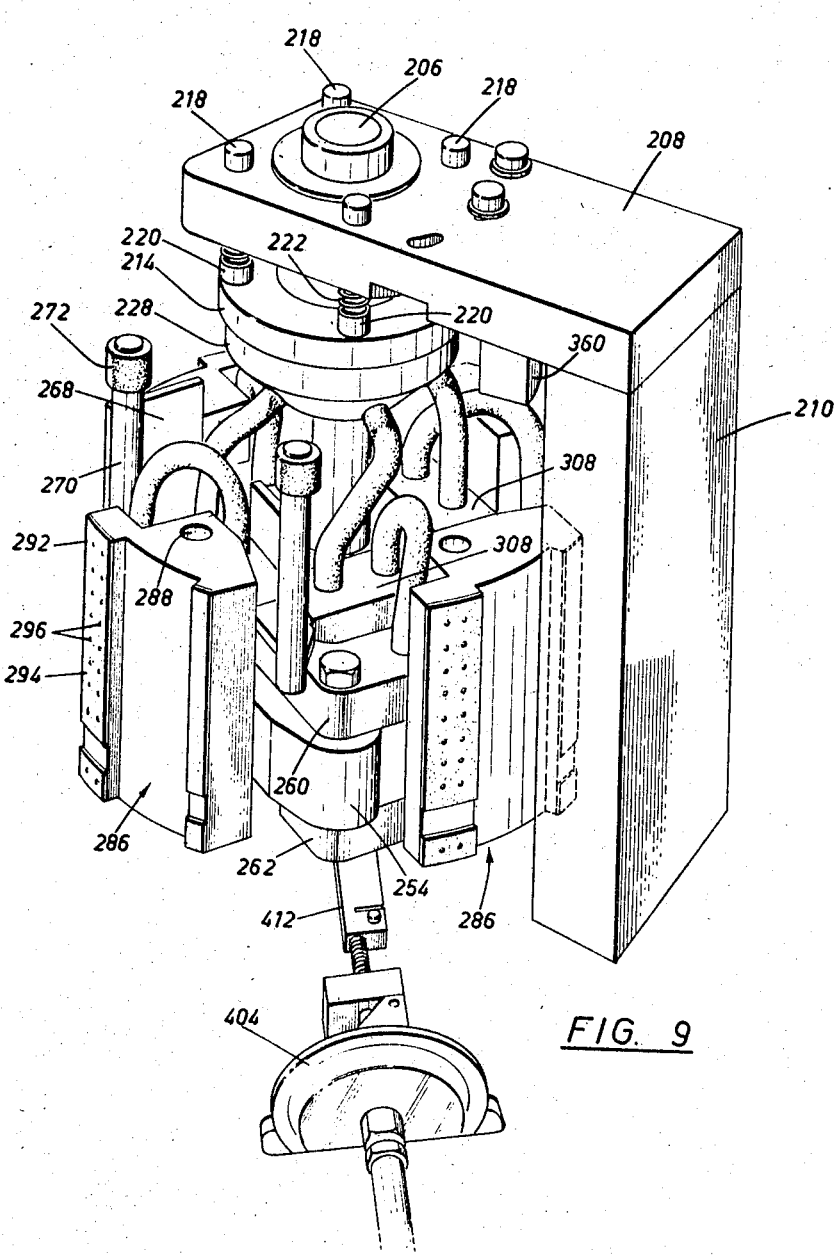
FIGURE 9 is a perspective view of the label applying mechanism.

The label applying mechanism, generally denoted by the numeral 204, see FIGURE 9, is positioned intermediate of the label gripping mechanism 136 and the conveyor 26, see FIGURE 1. It includes a shaft 206, the upper end of which is journalled in a horizontal arm 208 attached to an upright 210 secured to the platform 22, the lower end of the shaft 206 being journalled in the platform 22.

Figure 11:
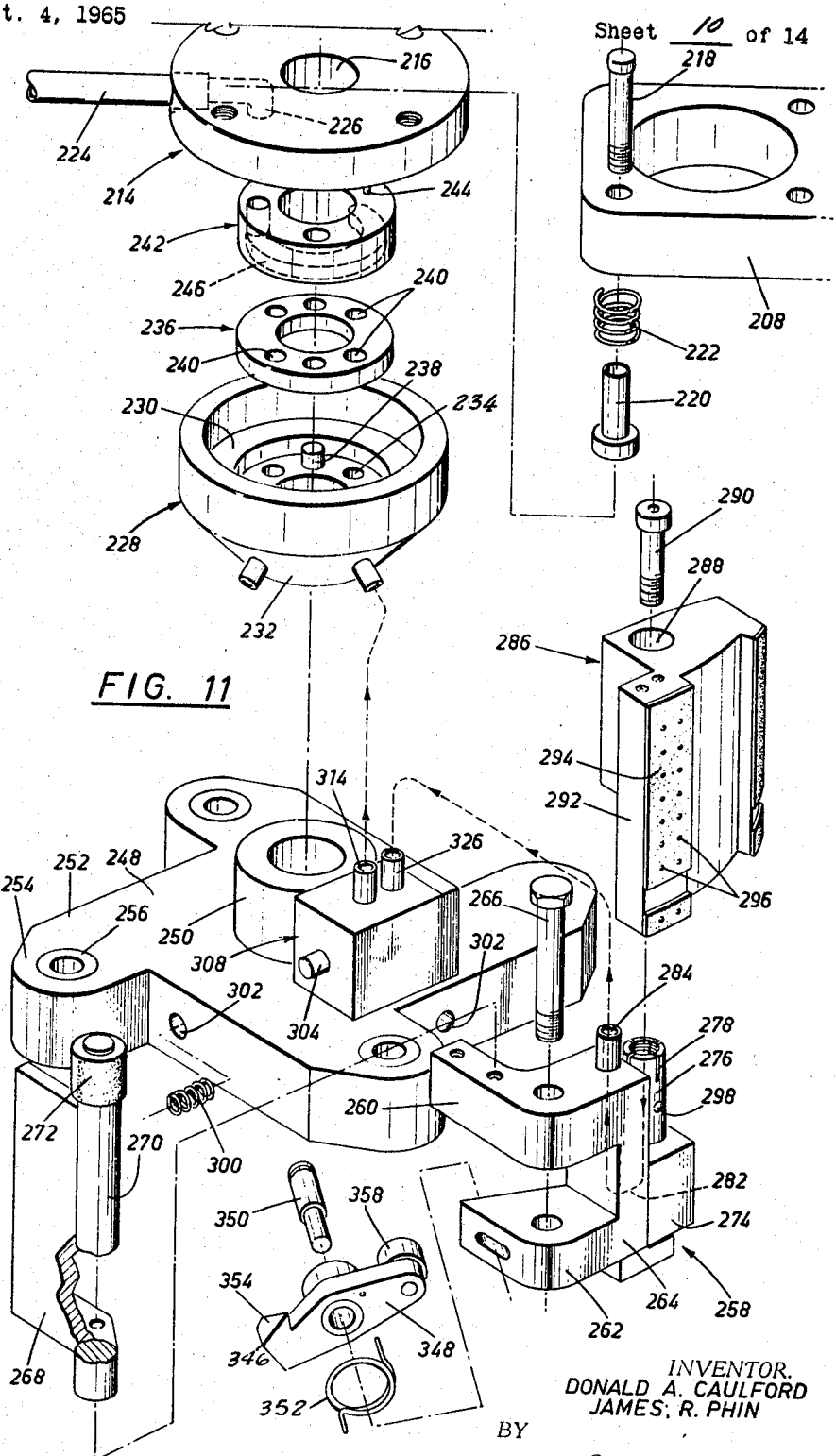
FIGURE 11 is an exploded view of the label applying mechanism.
Figure 17:
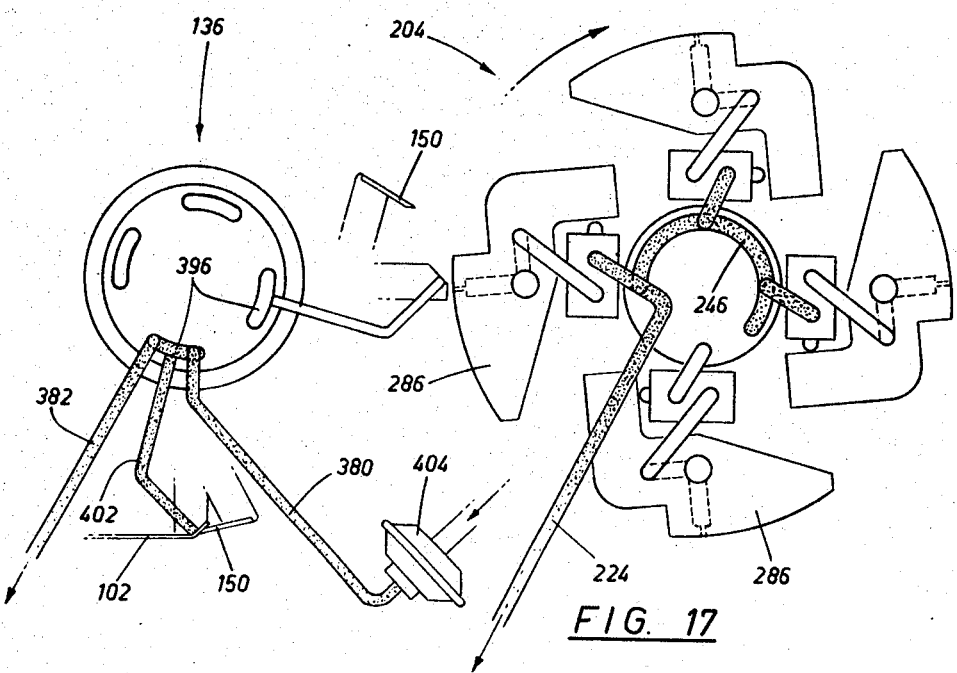
Figure 18:
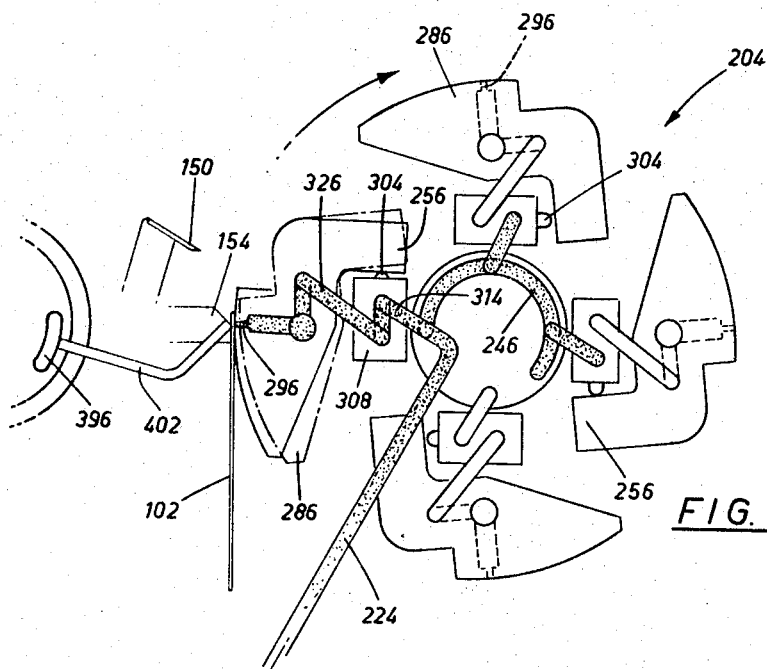
Figure 19:
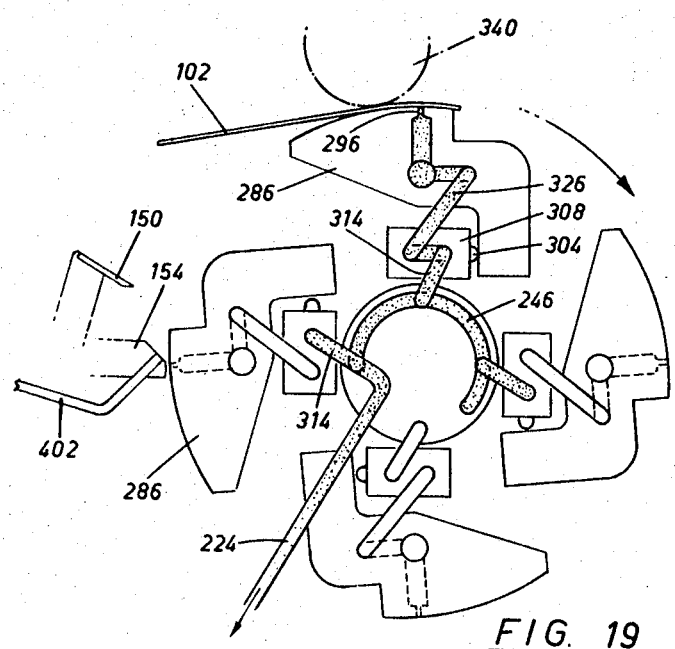
Figure 20:
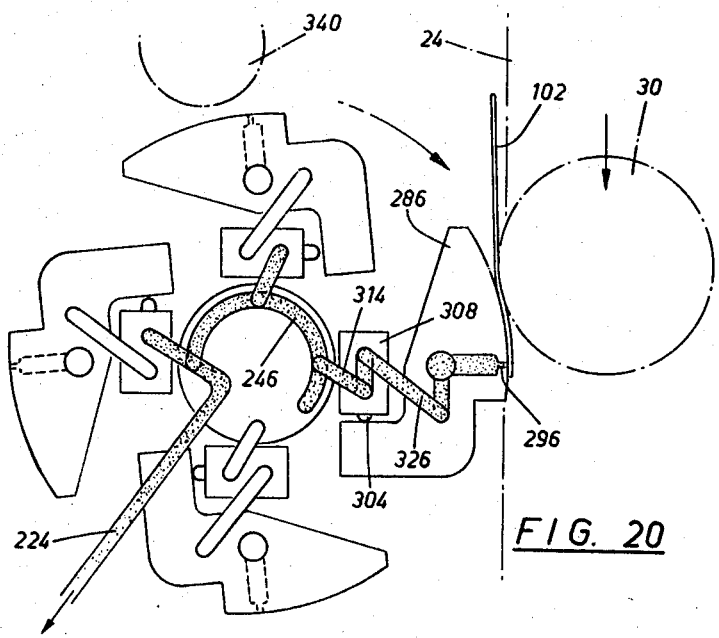

A valve assembly, generally denoted by the numeral 212, see FIGURE 11, is resiliently suspended from the arm 208. The valve assembly 212 surrounds the shaft 206 and it includes a circular plate 214 having a central orifice 216 surrounding the shaft 206. The circular plate 214 is located with respect to the arm 208 by means of traversing pins 218, the shanks of which are threaded in the circular plate 214. A hollow pin 220 surrounding the pin 218 rests on the circular plate 214, and provides a means for supporting a spring 222 which surrounds the hollow pin 220 and bears against the arm 208.

A flexible conduit 224 connected to the vacuum pump is linked to a horizontal channel 226 provided in the circular plate 214; the channel 226 turns downwards at its inner end to exit from the underside of the circular plate 214.

The valve assembly 212 also includes a hollow wall member 228 surrounding the shaft 206 and positioned below the circular plate 214. An internal horizontally disposed circular flange 230 is provided in the lower part of the hollow wall member 228, the inside diameter of the flange 230 corresponding with the diameter of the shaft 206 being keyed thereto. The hollow wall member 228 has a lower truncated portion 232 which depends from the flange 230. Four channels 234 are provided in the truncated portion 232, each emerging from the sides thereof being spaced at 90° with respect to each other and entering the hollow wall member 228 in the flange 230.

A ring 236 rests on the flange 230 in fixed relation thereto by means of a pair of diametrically opposed pins 238 which project through the ring 236. Four apertures 240 also spaced at 90° are provided in the ring 238, these being in line with the channels 234. Another ring 242 rests on the ring 236 in bearing relation thereto but is secured to the underside of the circular plate 214 by pins 244. A horizontally disposed arcuate channel 246 is provided in the ring 242, the channel 246 being the same distance from the axis of the shaft 206 as the exit of the channel 226 in the circular plate 214; one end of the channel 246 is upturned to communicate with the channel 226 of the circular plate 214. The length of the channel 246 is such that it subtends an angle of 270°.

It will be clear that in this arrangement rotation of the hollow wall member 228 with its associated ring 236 will permit the passage of vacuum to each of the channels 234 for threequarters of their rotation, but will be terminated for the remainder.

The label applying mechanism also includes a substantially rectangular shaped hub member 248 which is keyed to the shaft 206 by means of a boss 250 positioned some distance below the hollow wall member 228; each edge 252 of the hub member 248 is extended outwardly at one corner in order to form an abutment 254 on the adjacent edge 252, see FIGURE 11. Each abutment 254 is provided with a bushing 256.

A member, generally denoted by the numeral 258, see FIGURE 11 and comprising a pair of spaced apart upper and lower substantially L-shaped arms 260 and 262 respectively and integral with a vertically disposed cross arm 264 is provided on each abutment 254 by means of a pin 266 extending through the bushing 256. The upper arm 260 is L-shaped, the point at which it is pivoted to the hub member 248 being positioned at the elbow. The portion of the L-shaped arm 260 removed from the cross arm 264 rests on the hub member 248 in proximity to the edge 252 and the L-shaped arm 260 supports a plate 268 which extends upwards in substantially the same plane. The vertical edge of the plate 268 adjacent the pivot point on the abutment 254 carries a bar 270 the upper end of which is provided with a roller element 272.

The face of the cross arm 264 removed with respect to the arms 260 and 262 is provided with a lug 274. An upstanding tube 276, the upper part of which has slits 278 and a threaded bore, is secured to the face of the lug 274. This tube 276 communicates with a channel 280 in the lug 274, see FIGURE 11, and then with another channel 282 provided in the cross arm 264, the channel 282 communicating, in turn, with a short tube 284 secured to the upper face of the cross arm 264.

A member 286, see FIGURE 11, is supported by the lug 274, the body of the member 286 being provided with a vertical channel 288 in which is frictionally engaged the upstanding tube 276, by means of a tapered threaded pin 290 which engages with the threaded bore of the upstanding tube 276. The member 286 has a vertically disposed abutment 292 which is positioned outwardly of the member 286 with respect to the hub member 248, the abutment 292 being provided with a pad 294 having apertures 296 extending inwardly through the abutment 292 and the member 286 to communicate with the upstanding tube 276 by means of an opening 298 in the front of the tube 276. The member 286 rests on the lug 274 in fixed relation to the cross arm 264, the adjoining surface of the vertical abutment 254 and the body of the member 286 bearing against the adjacent surfaces of the cross arm 264.

Each member 286 is biased outwardly of the hub member 248 by means of an individual spring 300 projecting from an aperture 302 in the side of the hub member 248, the spring 300 bearing against the inner surface of the cross arm 264. The outward pivotal movement of the member 286 about the abutment 254 is, in turn, limited when the plate 268 makes contact with the projecting portion of a horizontally disposed plunger 304, see FIGURE 13, slidably supported in a channel 306 provided in valve housing 308 individual to each member and mounted on the hub member 248, see FIGURE 11.

The mid portion 310 of the plunger 304 is reduced in diameter with respect to the channel 306; an upstanding tube 312 constituting a valve port is provided in the valve housing 308. The inner end of the upstanding tube 312 communicates with the channel 306 in the region occupied by the reduced portion 310 of the plunger 304 and outer end of tube 312 is connected by a flexible tube 314 to the immediately adjacent channel provided in the hollow wall member 228.

The plunger 304 is flared to an end portion 316 which is shaped to seat against the sloping end wall of a chamber 318 which communicates with the channel 306. The inner surface of the flared end portion 316 of the plunger 304 is provided with a flange 320 on which is superimposed a smaller flange 322.

An upstanding tube 324 communicates with the chamber 318 the tube 324 constituting the other port in the valve housing 308 and connected by a flexible tube 326 to the upstanding tube 276. The end of the chamber 318 opposed to the flared end portion 316 of the plunger 304 is closed by a member 328 which is provided with a hollow open ended abutment 330 aligned with the channel 306 and projecting into the chamber 318 clear of its walls. The hollow abutment 330 serves as a vent to atmosphere from the valve housing 308 and it is closed on entry of the flange 320 of the plunger 304 into the hollow abutment 330 due to pressure of the plate 268; the flange 320 contacts an inner slidable collar 332 biased from a fixed collar 334 by a spring 336. A return spring 338 bears against the flange 322.

As illustrated in FIGURE 10 each member 286 rotates in a circular path wherein it is normally biased outwards to receive a label from the label gripping apparatus 136, the rotation of which is synchronized so that the release of a label from a gripper 148 corresponds with the arrival of a member 286 the latter connected through the valve housing 308 to the vacuum source. After transfer of the label the member 286 rotates to a position at approximately an angle of 90° with respect to that of transfer to contact a glue applying roll 340. After the glue has been applied to the label the latter is carried by the member 286 to a position diametrically opposed to that of transfer to contact a container moving on the conveyor 26 which is synchronized to correspond with the arrival of the label as illustrated in FIGURE 10. A pair of discs 342, see FIGURE 1, journalled on a support 344 may be used to provide the requisite pressure to the passing container to ensure even application of the label but alternatively another label applying mechanism may be positioned in place of discs 342 in which case a further label is applied to the other side of the conveyor 26.

The pressure applied by the container to the pad 294 is such that it causes the member 286 to pivot about the abutment 254 and it is a further feature of the invention that this rotation of the member 286 causes it to pivot into a circle of reduced diameter wherein it would not be in a position to subsequently accept a transfer of the label from the label gripping mechanism 136; the member 286 is retained in the inward position through the action of a latch mechanism, generally denoted by the numeral 346, see FIGURE 12.

Each latch mechanism 346 consists of a pawl 348 hinged at its mid point on the free end of the lower arm 262 by means of a pin 350. The pawl 348 is biased by a spring 352 secured to the arm 262, the spring 352 being adapted so that the toothed end 354 of the pawl 348 bears against the underside of the hub member 248. An insert 356 providing a ratchet is secured to the underside of the hub member 248 near its periphery and adjacent to the latch mechanism 346. On inward rotation of the member 286 the toothed end 354 of the pawl 348 moves towards the perimeter of the hub member 248 and engages with the ratchet of the insert 356 thereby securing the member 286 in its inward position. The other end of the pawl 348 is provided with a roller 358.

In the event that the pressure of the container is insufficient to guide the member 286 into the position where the pawl 354 engages with the ratchet 356 the member 286 is guided by a safety device which comprises an adjustable cam 360 secured to the underside of the arm 208, see FIGURE 9, which cam 360 engages with the roller element 272 carried at the upper end of the vertical bar 270.

It will be appreciated that inward pivoting of the member 286 either by means of pressure by the container or the action of the adjustable cam 360 will remove the pressure from the plunger 304 causing the valve housing 308 to vent to atmosphere. At this time the supply of vacuum is terminated through the flexible tube 314 and the valve assembly 212 because the connecting channel 234 ceases to be in communication with the arcuate channel 246 in the ring 242. The venting to atmosphere takes place during the predetermined portion of the rotation of the hub 248, occurring after the pad 294 has applied a label to the container and somewhat before it reaches the position where it would contact the corresponding label gripping element, provided the latter carries a label.

Figure 8:
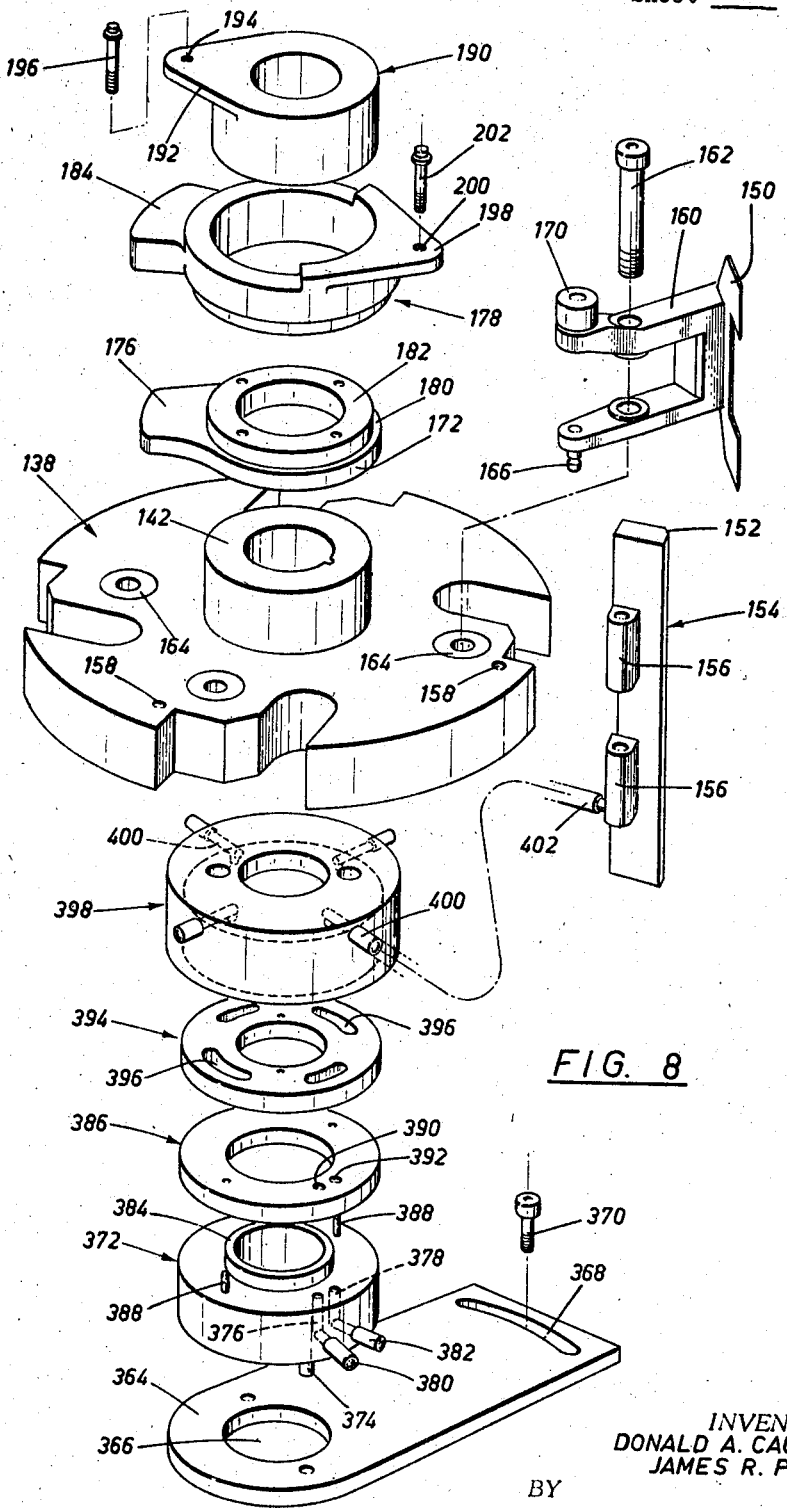
FIGURE 8 is an exploded view of the cam mechanism and the sensing elements in the label gripping mechanism.

To determine whether a label is ready to be transferred a vacuum sensing mechanism, generally denoted by the numeral 362, is provided in the label gripping mechanism 136, see FIGURE 8. This includes a plate 364 mounted on the table 22, one end of which has an orifice 366 surrounding the shaft 140, the other end of the plate 364 having a slot 368 which engages with an adjusting pin 370 secured to the table 22. A stationary collar 372, also surrounding the shaft 140, rests on the plate 364 being secured thereto by means of pins 374. The collar 372 is provided with a pair of upstanding channels 376 and 378, each communicating with two flexible tubes 380 and 382 respectively, the tube 382 being connected to a vacuum source. The collar 372 has an upstanding circular flange 384 surrounded by a ring 386 which in turn is secured to the collar 372 by means of pins 388. The ring 386 has a pair of vertical channels 390 and 392 which are aligned with the channels 376 and 378. Resting on the stationary ring 386 is another ring 394 rotatable with the shaft 140. The ring 394 has four equally spaced arcuate slots 396 above the ring 394 and secured thereto is a further ring 398 provided with four equally spaced horizontal channels 400 which then depend downwards to vent with the respective arcuate slots 396 in the rotating ring 394. Each channel 400 is connected to an orifice 402 provided in the rear of the nearest fixed finger 154 which orifice 402 extends through to the face of the inclined clamping edge 152.

The tube 380 emanating from the collar 372 is connected to a vacuum diaphragm 404, see FIGURES 9 and 14, supported in the table 22. Leading inwards from the vacuum diaphragm 404 in the direction of the sub element 248 is a horizontal bar 406 carried in a journal 408 also mounted on the table 22. The end of the bar 406 protruding from the journal 408 is secured to another bar 412 which extends inwards through a bearing 414 secured to the table 22 under the hub 248. The bar 412 is normally biased away from the journal 408 in the direction of the hub 248 by means of a spring 416. The inner end of the bar 404 is provided with a cam surface 418 and is adapted to engage with the roller 358, see FIGURE 15, carried by the end of the pawl 348 when the vacuum is applied to the diaphragm 404, thus causing the bar 412 to move against the spring 416.

The bar 412 is positioned with respect to the hub element 248 to operate on the roller 358 immediately after the member 286 to rotate to its inward position, see FIGURE 10; the action of the bar 412 releases the pawl 348 from the ratchet 356 thus permitting the member 286 to rotate into its outward position in readiness to receive a label from the label gripping mechanism 136.

The transfer of a label from the pack 102 to an individual gripper 148 is determined by the fact that the label which covers the face of the inclined clamping edge closes the orifice 402 extending therethrough. As a result on continued rotation of the gripper 148 bearing the label a point is reached where the arcuate slot 396 in the ring 394, which arcuate slot 396 is connected to the respective orifice 402, is aligned with the channels 376, 378, 390 and 392 of the lower stationary ring 386 and collar 372. The position of alignment may be adjusted by means of the plate 364 and it is arranged to occur prior to the point where the label on the gripper 148 will be transerred to the respective member 286. At the instant of alignment of the arcuate slot 396 as described above the vacuum circuit in the sensing mechanism 362 is closed and the diaphragm 404 is thereby actuated causing outward movement of the bar 412 against the roller 358 thereby releasing the pawl 348 to permit the member 286 to rotate to its outward position.

The sequence of operation is diagrammatically illustrated in FIGURES 16, 17, 18, 19 and 20. As illustrated in FIGURE 16 the label is transferred to the vacuum bar 112 connected to the vacuum source, the transfer being assisted by action of an air jet from the hollow member 122. The label which is then held between the gripper 148 and the inclined clamping edge 152 is carried around by the drum element 138; the label covering the sensing orifice 402 causes the vacuum to operate the diaphragm 404 thereby operating the latch mechanism 346 as already described. This allows the pad 294 to move out into position to receive the label at which time the plate 268 also rotates thereby opening the port in the valve housing 308. The label is released by the gripper 148 and transferred to the vacuum pad 294 after which glue is applied to the label from the roll 358. The pad 294 then rotates around whereby a point in the label contacts the container, the vacuum pad 294 being rotated to its inward position through pressure of the container. If this is insufficient the rotation of the pad 294 inward is ensured by action of the adjustable cam 360 and pad 294 is secured in the latched position. The action of rotating the vacuum pad 294 inwards to the latched position cuts off the vacuum supplied to the pad 294 through the valve housing 308; at the same time the exhaust vent 330 is opened in the valve housing 308 to allow residual vacuum in the vacuum pad 294 to be released.

While certain embodiments have been illustrated and described for the purpose of disclosure, it will be understood that the invention is not limited thereto, but contemplates such modifications and other embodiments as may be utilized without departing from the invention.

We claim:

1. Automatic labelling apparatus for applying individual labels to containers comprising conveyor means adapted to transport said containers at a predetermined velocity, a first hub element mounted for rotation on a shaft, label carrying means on said hub element located at its periphery, said label carrying means being synchronized to contact a respecitve container, said label carrying means including a pad and a vacuum source connected to said pad, a second hub element mounted for rotation on a separate shaft, releasable label gripping means carried by said second hub element located at its periphery, the rotation of said separate shaft being synchronized with said shaft so that said vacuum pad contacts a label on release from said label gripping means, said vacuum pad being pivotal between the position where it is biased outwards of said shaft to contact a label on release from said gripping means and inwards towards said shaft on application of said label to said container.

2. Automatic labelling apparatus according to claim 1 having means retaining said pad in said inward position.

3. Automatic labelling apparatus according to claim 2 in which said retaining means comprises a pawl pivotally secured to said pad, one end of said pawl bearing against the underside of said hub element and a ratchet on the underside of said hub element in which movement of said pad causing said pawl to move across the underside of said member to engage with said ratchet.

4. Automatic labelling apparatus according to claim 3 with means releasing said retaining means, said releasing means comprising a movable cam positioned under said hub element and means for actuating said cam connected to said vacuum source, said cam on actuation bearing against the other end of said pawl.

5. Automatic labelling apparatus according to claim 1 wherein said pad is connected to said vacuum source through a hollow member rotatable on and with said shaft, said hollow member having a port connected to said pad, the interior of said hollow member having internal means adapted to communicate with said vacuum source for a predetermined portion of its rotation on said shaft.

6. Apparatus according to claim 5 wherein said internal means in said hollow member comprises a first ring rotatable therewith, said ring having an aperture therethrough communicating with said port in said hollow member, a stationary ring bearing against said first rotatable ring and having an arcuate channel on its underface, one end of said arcuate channel being upturned to exit on the upper surface, a second stationary ring superimposed on said first ring having a channel therethrough communicating between said upturned channel and said vacuum source, the arrangement being such that on rotation of said first ring the vacuum to said pad is terminated when the aperture in said ring ceases to be in communication with said arcuate channel.

7. Automatic labelling apparatus for applying individual labels to containers comprising conveyor means adapted to transport said containers at a predetermined velocity, a first hub element mounted for rotation on a shaft, label carrying means on said hub element located at its periphery, said label carrying means being synchronized to contact a respective container, said label carrying means including a pad and a vacuum source connected to said pad, a second hub element mounted for rotation on a separate shaft, releasable label gripping means carried by said second hub element located at its periphery, the rotation of said separate shaft being synchronized with said shaft so that said vacuum pad contacts a label on release from said label gripping means, said vacuum pad being pivotal between the position where it is biased outwards of said shaft to contact a label on release from said gripping means and inwards towards said shaft on application of said label to said container, valve means on said first hub element connecting said vacuum source to said pad, said valve means being movable to a position where it vents to atmosphere and means carried by said pad on pivotal movement to said inward position venting said valve means to atmosphere.

8. Automatic labelling apparatus according to claim 7 in which said valve means comprises a hollow housing supported on said first hub element, a plunger slidable in said housing and projecting therefrom, said plunger being resiliently biased in said housing to close said vent to atmosphere and said means carried by said pad on pivotal movement bearing against the projecting portion of said plunger.

9. Automatic labelling apparatus for applying individual labels to containers comprising conveyor means adapted to transport said containers at a predetermined velocity, a first hub element mounted for rotation on a shaft, label carrying means on said hub element located at its periphery, said label carrying means being synchronized to contact a respective container, said label carrying means including a pad and a vacuum source connected to said pad, a second hub element mounted for rotation on a separate shaft, releasable label gripping means carried by said second hub element located at its periphery, the rotation of said separate shaft being synchronized with said shaft so that said vacuum pad contacts a label on release from said label gripping means, said vacuum pad being pivotal between the position where it is biased outwards of said shaft to contact a label on release from said label gripping means and inwards towards said shaft on application of said label to said container, means retaining said pad in said inward position, sensing means on said second hub element to detect the presence of a label on said label gripping means and means releasing said retaining means to allow biased pivoting outwards of said pad responsive to detection of said label by said sensing means.

10. Automatic labelling apparatus according to claim 9 wherein said sensing means comprises a port in said label gripping means connected to said vacuum source, the label on said label gripping means closing said port and said releasing means is connected to said vacuum source through said sensing means and is activated by closing of said port.

11. Apparatus according to claim 10 wherein said releasing means is connected to said vacuum source through said sensing means by a valve assembly, said assembly comprising a first fixed collar surrounding said separate shaft, said first collar having two spaced apart channels therethrough one communicating with said vacuum source and the other with said releasing means, a second fixed collar superimposed on said first collar and having a pair of spaced apertures communicating respectively with said channels, a third collar rotatable with said shaft and having an arcuate channel therein, said arcuate channel being at least the length of the distance apart of said spaced apart apertures, and a fourth collar rotatable with said third collar, said fourth collar having a channel communicating at one end with said arcuate channel and at the other end with said port, the arrangement being such that said arcuate channel communicates with said spaced apart apertures immediately prior to contact of said label by said pad thereby actuating said releasing means.

12. Automatic labelling apparatus for applying individual labels to containers comprising conveyor means adapted to transport said containers at a predetermined velocity, a first hub element mounted for rotation on a shaft, label carrying means on said hub element located at its periphery, said label carrying means being synchronized to contact a respective container, said label carrying means including a pad and a vacuum source connected to said pad, a second hub element mounted for rotation on a separate shaft, releasable label gripping means carried by said second hub element located at its periphery, the rotation of said separate shaft being synchronized with said shaft so that said vacuum pad contacts a label on release from said label gripping means, said vacuum pad being pivotal between the position where it is biased outwards of said shaft to contact a label on release from said gripping means and inwards towards said shaft after application of said label to said container.

13. Automatic labelling apparatus according to claim 12, having a support in which the upper end of said shaft is journalled, an adjustable cam mounted on said support, a member depending upwards from said pad and engaging said adjustable cam to guide said pad inwards toward said shaft.

14. Automatic labelling apparatus for applying individual labels to containers comprising conveyor means adapted to transport said containers at a predetermined velocity, a first hub element mounted for rotation on a shaft, label carrying means on said hub element located at its periphery, said label carrying means being synchronized to contact a respective container, said label carrying means including a pad and a vacuum source connected to said pad, a second hub element mounted for rotation on a separate shaft, releasable label gripping means carried by said second hub element located at its periphery, the rotation of said separate shaft being synchronized with said shaft so that said vacuum pad contacts a label on release from said label gripping means, said vacuum pad being pivotal between the position where it is biased outwards of said shaft to contact a label on release from said gripping means and inwards towards said shaft on application of said label to said container, a label magazine mounted adjacent the periphery of said second hub element and means for withdrawing a label from said magazine, said label gripping means seizing said label from said withdrawing means.

15. Automatic labelling apparatus according to claim 14 having means for directing a blast of air against the side of said label on withdrawal from said magazine.

16. Automatic labelling apparatus according to claim 14 wherein the labels in said magazine are biased against said withdrawing means.

17. Automatic labelling apparatus for applying individual labels to containers comprising conveyor means adapted to transport said containers at a predetermined velocity, a first hub element mounted for rotation about a vertical axis on a shaft carried by said support structure, label carrying means on said hub element located at its periphery, said label carrying means being synchronized to contact a respective container, said label carrying means including a pad and a vacuum source connected to said pad, a second hub element mounted for rotation about a vertical axis on a separate shaft carried by said support structure, releasable label gripping means carried by said second hub element located at its periphery, the rotation of said separate shaft being synchronized with said shaft so that said vacuum pad contacts a label on release from said label gripping means, adhesive supplying means, said label on said vacuum pad contacting said adhesive supplying means before contacting a respective container, said vacuum pad being pivotal between the position where it is biased outwards of said shaft to contact a label on release from said gripping means and inwards towards said shaft on application of said label to said container, a label magazine mounted adjacent the periphery of said second hub element, means for withdrawing a label from said magazine, said label gripping means seizing said label from said withdrawing means.

18. Automatic labelling apparatus according to claim 17 wherein said container is supported on application of said label by said label carrying means.

References Cited

UNITED STATES PATENTS

| | | | |
|---|---|---|---|
| 2,214,096 | 9/1940 | Weiss | 156—364 XR |
| 2,525,741 | 10/1950 | Von Hofe et al. | 156—448 XR |
| 2,764,408 | 9/1956 | Weiler | 271—33 |
| 2,936,921 | 5/1960 | Schulz | 156—568 XR |
| 2,967,636 | 1/1961 | Manas et al. | 156—571 XR |
| 3,005,565 | 10/1961 | Doane et al. | 156—571 |
| 3,097,983 | 7/1963 | Caulford et al. | 156—364 |

EARL M. BERGERT, *Primary Examiner.*

D. J. FRITSCH, *Assistant Examiner.*

U.S. Cl. X.R.

156—568, 571